United States Patent
Cho

(10) Patent No.: US 8,339,434 B2
(45) Date of Patent: Dec. 25, 2012

(54) LIGHT SCANNING UNIT AND ELECTROPHOTOGRAPHIC IMAGE FORMING APPARATUS EMPLOYING THE SAME

(75) Inventor: Won-Young Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 133 days.

(21) Appl. No.: 12/875,291

(22) Filed: Sep. 3, 2010

(65) Prior Publication Data
US 2011/0050839 A1    Mar. 3, 2011

(30) Foreign Application Priority Data
Sep. 3, 2009   (KR) .......................... 10-2009-0083152

(51) Int. Cl.
*B41J 15/14*   (2006.01)
*B41J 27/00*   (2006.01)

(52) U.S. Cl. ........................................ 347/244; 347/258
(58) Field of Classification Search ................... 347/230, 347/241–244, 256–261
See application file for complete search history.

(56) References Cited

U.S. PATENT DOCUMENTS
2007/0228266 A1 * 10/2007 Tomita et al. ................. 250/234
2008/0204841 A1 *  8/2008 Suzuki et al. ................. 359/204

\* cited by examiner

*Primary Examiner* — Hai C Pham
(74) *Attorney, Agent, or Firm* — Staas & Halsey LLP

(57) ABSTRACT

Provided are a light scanning unit and an electrophotographic image forming apparatus employing the same. A possible form deviation during fabrication of a cylindrical lens employed by the light scanning unit is reduced by intentionally giving a form deviation to the incident surface and the emission surface of the cylindrical lens in the main scanning direction.

13 Claims, 4 Drawing Sheets

LIGHT SCANNING UNIT AND ELECTROPHOTOGRAPHIC IMAGE FORMING APPARATUS EMPLOYING THE SAME

CROSS-REFERENCE TO RELATED APPLICATION

This application claims the benefit of Korean Patent Application No. 10-2009-0083152, filed on Sep. 3, 2009, in the Korean Intellectual Property Office, the disclosure of which is incorporated herein in its entirety by reference.

BACKGROUND

1. Field

The embodiments relate to a light scanning unit and an electrophotographic image forming apparatus employing the same, and more particularly, to a light scanning unit including a cylindrical lens and an electrophotographic image forming apparatus employing the light scanning unit.

2. Description of the Related Art

A light scanning unit is a unit scanning light emitted by a light source to a predetermined region, and is used in various devices such as electrophotographic image forming apparatuses and scanning type display apparatuses.

For example, in an electrophotographic image forming apparatus, when a light scanning unit irradiates a light beam to a photoconductor, such as a photoconductive drum, main scanning due to the light scanning unit and sub scanning due to movement of the photoconductor form an electrostatic latent image on the photoconductor. The formed electrostatic latent image is developed into a developed image by using a developer, such as a toner, and the developed image is transferred onto a printing medium.

A light scanning unit includes a light deflector, which deflect-scans a light beam emitted by a light source to a photoconductor, and an optical device (lens), which refract-images a light beam emitted by a light source. Examples of optical devices of a light scanning unit include a cylindrical lens, which condenses a light beam emitted by a light source onto a reflective surface of the light deflector in the sub scanning direction, and a scanning lens, which irradiates a light beam scanned by a light deflector on a photoconductor.

SUMMARY

Accordingly, it is an aspect to provide a light scanning unit including a cylindrical lens with small form deviations and an electrophotographic image forming apparatus employing the light scanning unit.

Additional aspects and/or advantages will be set forth in part in the description which follows and, in part, will be apparent from the description, or may be learned by practice of the invention.

The foregoing and/or other aspects are achieved by providing a light scanning unit including a light source which emits a light beam; a light deflector which deflects and scans the light beam emitted by the light source in a main scanning direction; and a cylindrical lens which is disposed between the light source and the light deflector and images the light beam emitted by the light source on a reflective surface of the light deflector in a sub scanning direction that is perpendicular to the scanning direction, wherein at least one of an incident surface and an emission surface of the cylindrical lens is curved in the main scanning direction.

The foregoing and/or other aspects are achieved by providing an electrophotographic image forming apparatus including a photoconductor; a light scanning unit which forms an electrostatic latent image on a surface being scanned of the photoconductor by scanning a light beam thereto; and a developer which develops the electrostatic latent image formed on the photoconductor by supplying a toner thereto, wherein the light scanning unit comprises: a light source which emits the light beam; a light deflector which deflects and scans the light beam emitted by the light source in a main scanning direction that is perpendicular to the main scanning direction; and a cylindrical lens which is disposed between the light source and the light deflector and images the light beam emitted by the light source on a reflective surface of the light deflector in a sub scanning direction that is perpendicular to the main scanning direction, and at least one of an incident surface and an emission surface of the cylindrical lens is curved in the main scanning direction.

The cylindrical lens may satisfy mathematical expressions $10 < |Rn| < 1000 (n=1,2)$ and $R_1 \cdot R_2 > 0$, where R1 indicates a radius of curvature of the incident surface of the cylindrical lens in the main scanning direction, and R2 indicates a radius of curvature of the emission surface of the cylindrical lens in the main scanning direction.

The cylindrical lens further may satisfy a mathematical expression, $$R_2 = R_1 - \left(\frac{n-1}{n}\right)d,$$

where n indicates a refractive index of the cylindrical lens, and d indicates a center thickness of the cylindrical lens.

The light scanning unit may further include a collimating lens which is disposed between the light source and the light deflector and collimates a light beam emitted by the light source to obtain collimated light.

The light scanning unit may further include an imaging optical unit which images a light beam deflected and scanned by the light deflector on a surface being scanned of a photoconductive drum.

The cylindrical lens may further satisfy a mathematical expression, $$|l - l_0| < \frac{\pi w_0^2}{\lambda}\sqrt{\alpha^2 + 2\alpha},$$

where l indicates an imaging distance of an entire optical system of the light scanning unit with respect to the main scanning direction, $l_0$ indicates an imaging distance of an entire optical system of the light scanning unit with respect to the main scanning direction in the case of employing a cylindrical lens of which both the incident surface and the emission surface are flat in the main scanning direction, $w_0$ indicates the beam diameter of the light beam in the main scanning direction when the light scanning unit is designed, λ indicates the wavelength of the light beam, and a indicates a tolerable variation of the beam diameter.

The cylindrical lens may further satisfy a mathematical expression, $$|l - l_0| < 0.1 \frac{w_0^2}{\lambda}.$$

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
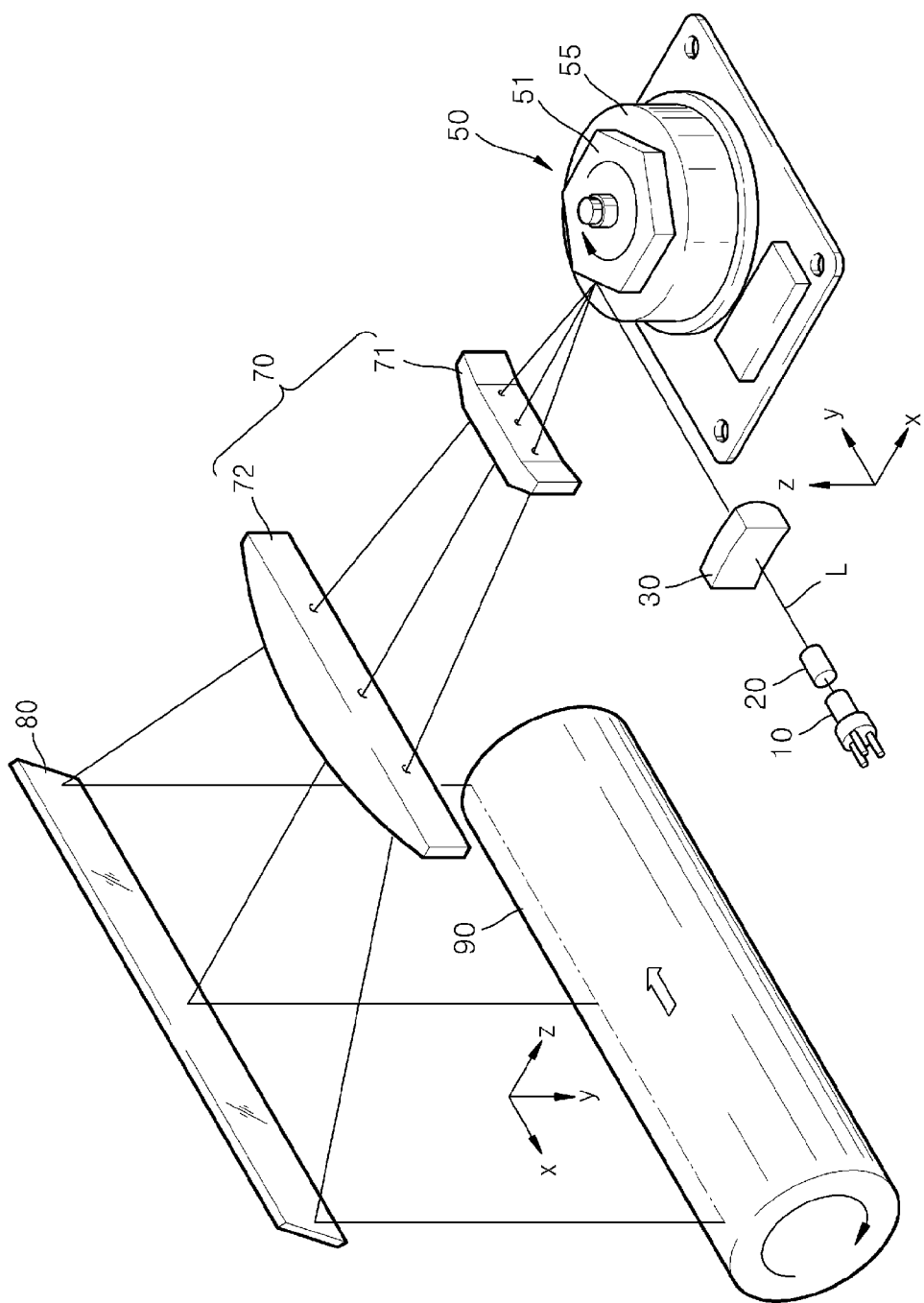
FIG. 1 is a perspective view of the optical arrangement of a light scanning unit according to an embodiment.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a perspective view of the optical arrangement of a light scanning unit.

Referring to FIG. 1, the light scanning unit includes a light source 10 emitting a light beam L, a light deflector 50 scanning the light beam L in a main scanning direction x, a cylindrical lens 30 imaging the light beam L emitted by the light source 10 on a reflective surface of the light deflector 50 in a sub scanning direction z, and an imaging optical unit 70 imaging the light beam L scanned by the light deflector 50 on a surface being scanned of a photoconductive drum 90. The main scanning direction x is a direction in which the light beam L travels as the polygon mirror rotates, and is perpendicular to the rotation axis of a polygon mirror 51. Meanwhile, the sub scanning direction z is a direction perpendicular to the main scanning direction x when viewed from the surface being scanned of the photoconductive drum 90, and corresponds to a direction in which the rotation axis of the polygon mirror 51 extends.

The light source 10 may be a semiconductor laser diode.

The light deflector 50 includes the polygon mirror 51, which has a plurality of reflective surfaces, and a motor 55, which rotates the polygon mirror 51. The light beam L emitted by the light source 10 is deflection-reflected on a reflective surface of the light deflector 50 toward the photoconductive drum 90, and is scanned in the main scanning direction x as the light deflector 50 rotates clockwise. The light deflector 50 may be a mirror scanner including a micro electro-mechanical system (MEMS).

The cylindrical lens 30 is a lens that is disposed on a light path between the light source 10 and the light deflector 50 and linearly images the light beam L incident to the light deflector 50 by condensing the light beam L emitted by the light source 10 in the sub scanning direction z. The cylindrical lens 30 has a positive refractive power in the sub scanning direction z, so that the light beam L, which passes through the cylindrical lens 30, is condensed in the sub scanning direction z. Furthermore, an incident surface and an emission surface of the cylindrical lens 30 are curved surfaces having curvatures in the main scanning direction x. Detailed descriptions of the cylindrical lens 30 will be provided later.

A collimating lens 20 may further be disposed on the light path between the light source 10 and the light deflector 50. The collimating lens 20 is a lens which condenses the light beam L emitted by the light source 10, such that the light beam L is collimated in the sub scanning direction z and the main scanning direction x. Although the embodiment provides a configuration in which the light beam L, which is converted to collimated light by the collimating lens 20, travels toward the cylindrical lens 30, positions of the collimating lens 20 and the cylindrical lens 30 may be switched if necessary. An aperture stopper (not shown) may be further disposed between the collimating lens 20 and the cylindrical lens 30 to adjust the diameter of the light beam L. The collimating lens 20 and the cylindrical lens 30 constitute an incident optical unit of the light scanning unit.

The imaging optical unit 70 is an optical unit imaging the light beam L scanned by the light deflector 50 on a surface being scanned of the photoconductive drum 90, and is disposed between the light deflector 50 and the photoconductive drum 90. The imaging optical unit 70 includes first and second imaging optical lenses 71 and 72. The first and second imaging optical lenses 71 and 72 may be toric lenses of which both surfaces are toric surfaces. The first imaging optical lens 71 may have a positive refractive power in the main scanning direction x, and may have a refractive power of approximately zero in the sub scanning direction z. Meanwhile, the second imaging optical lens 72 may have a positive refractive power in the main scanning direction x. The first and second imaging optical lenses 71 and 72 may be fθ lenses which condense a light beam L and correct the light beam L to be scanned on the surface being scanned of the photoconductive drum 90 at a uniform velocity. Although FIG. 1 illustrates a case in which the imaging optical unit 70 includes two lenses, the embodiments are not limited thereto, and the imaging optical unit 70 may include one lens or may include three or more lenses. A reflective mirror 80, which is capable of properly altering a light path, may be further disposed between the imaging optical unit 70 and the photoconductive drum 90.

Figure 2:
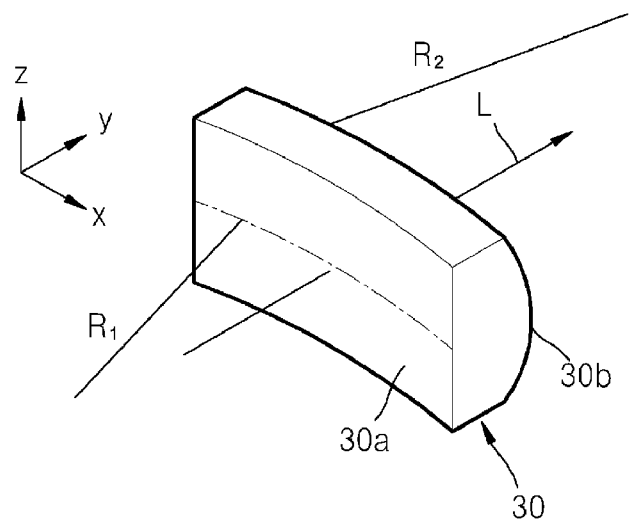
FIG. 2 is a perspective view of a cylindrical lens in the light scanning unit of FIG. 1, according to an embodiment.

FIG. 2 is a perspective view of the cylindrical lens 30 of the light scanning unit of FIG. 1.

Figure 3A:
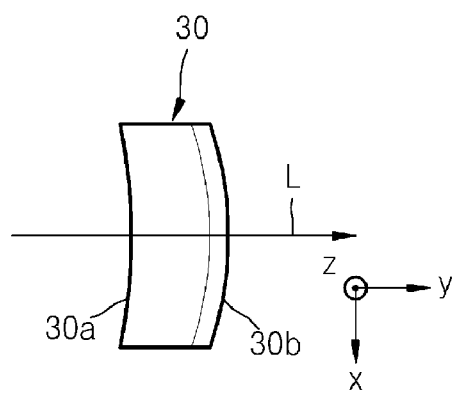
FIG. 3A is a plan view of the cylindrical lens of FIG. 2, viewed from the main scanning plane thereof.

Referring to FIG. 2, when viewed from the yz plane, the incident surface 30a of the cylindrical lens 30 is flat, whereas the emission surface 30b of the cylindrical lens 30 is curved. Thus, the cylindrical lens 30 has a refractive power with respect to the sub scanning direction z and condenses the light beam L, which passes through the cylindrical lens 30, on the reflective surface of the light deflector 50 in the sub scanning direction z. Meanwhile, when viewed from the xy plane, each of the incident surface 30a and the emission surface 30b of the cylindrical lens 30 is designed to be curved in the main scanning direction x, as shown in FIG. 3A. Here, if the radius of curvature of a surface is equal to or greater than 20,000 mm, the surface is effectively a flat surface. Thus, each of the incident surface 30a and the emission surface 30b of the cylindrical lens 30 may be designed to have a radius of curvature in the main scanning direction x less than 20,000 mm, and, for example, may be designed to have a radius of curvature in the main scanning direction x less than 1,000 mm. Meanwhile, each of the incident surface 30a and the emission surface 30b of the cylindrical lens 30 may be designed to have a radius of curvature in the main scanning direction x greater than 10 mm, such that refractive powers of the incident surface 30a and the emission surface 30b of the cylindrical lens 30 do not become excessive. Thus, the incident surface 30a and the emission surface 30b of the cylindrical lens 30 are designed to satisfy Mathematical Expression 1 below.

$$10 < |Rn| < 1000 (n=1,2)$$  [Mathematical Expression 1]

Here, $R_1$ indicates the radius of curvature of the incident surface 30a of the cylindrical lens 30 in the main scanning direction x, whereas $R_2$ indicates the radius of curvature of the emission surface 30b of the cylindrical lens 30 in the sub scanning direction z, wherein the radii of curvature are expressed in mm.

As shown in Mathematical Expression 1, the incident surface 30a and the emission surface 30b of the cylindrical lens 30 are designed to have significantly large radii of curvature and thus be gently curved in the main scanning direction x. Compared to an ideal cylindrical lens of which the incident surface and the emission surface are flat in the main scanning direction, such a curvature in the main scanning direction x corresponds to a form deviation in the main scanning direction x. A possible form deviation during fabrication is reduced by intentionally giving a form deviation to the incident surface 30a and the emission surface 30b of the cylindrical lens 30 in the main scanning direction x.

The cylindrical lens 30 is generally formed of a plastic material, and is fabricated using an injection molding process. Shapes of cylindrical lenses fabricated using an injection molding process may have a slight form deviation per shot. While deterioration of a beam diameter on a surface being scanned varies according to the size and the inclination of such a form deviation, the beam diameter generally becomes more significant if the size of a form deviation increases, and thus it is necessary to correct the shape of a core of the cylindrical lens 30 to be injection-molded to a shape closest to a designed shape. Since the incident surface and the emission surface of an ideal cylindrical lens are flat in the main scanning direction, a core is processed to be flat while a mold is processed for the injection-molding process. Since such a flat injection-molded object has no regular tendency in form deviations and exhibits an irregular form deviation in every shot, correction of a core to reduce form deviation is very difficult. Thus, since it is difficult to reduce form deviation in the main scanning direction of conventional cylindrical lenses, conventional cylindrical lenses have inherent beam diameter deterioration.

As described above, form deviations having predetermined curvatures in the main scanning direction x are intentionally provided to the incident surface 30a and the emission surface 30b of the cylindrical lens 30. Thus, form deviations occurring at the time of injection-molding the cylindrical lens 30 have regular tendencies based on the intentionally provided form deviations. Therefore, when a shape of the core is corrected and injection-molding is performed again, form deviation occurring at a time of injection-molding may be reduced.

Furthermore, the cylindrical lens 30 is designed to satisfy Mathematical Expression 2 below.

$$R_1 \cdot R_2 > 0$$  [Mathematical Expression 2]

Figure 3B:
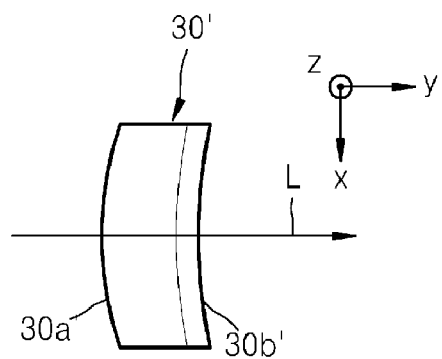
FIG. 3B is a plan view of a cylindrical lens, viewed from the main scanning plane thereof, according to another embodiment.

Accordingly, the radius of curvature of the incident surface 30a and the radius of curvature of the emission surface 30b have same signs, and thus the refractive power of the incident surface 30a in the main scanning direction x and the refractive power of the emission surface 30b in the main scanning direction x offset each other. FIGS. 2 and 3A show meniscus forms in which the radii of curvature of both of the incident surface 30a and the emission surface 30b of the cylindrical lens 30 are negative. However, as shown in FIG. 3B, for example, the radii of curvature of both of the incident surface 30a' and the emission surface 30b' of the cylindrical lens 30' may be positive.

Furthermore, the rear focal length of the cylindrical lens 30 in the main scanning direction x may be infinite. In other words, the refractive power of the cylindrical lens 30 in the main scanning direction x may be practically zero by designing the cylindrical lens 30 to satisfy Mathematical Expression 3 below.

$$R_2 = R_1 - \left(\frac{n-1}{n}\right)d$$  [Mathematical Expression 3]

Here, n indicates a refractive index of a cylindrical lens, and d indicates the center thickness of the cylindrical lens.

Accordingly, form deviations having predetermined curvatures in the main scanning direction x are provided to the incident surface 30a and the emission surface 30b of the cylindrical lens 30, wherein the optical effect of the cylindrical lens 30 in the main scanning direction x is removed. Thus, the light beam L collimated by the collimating lens 20 is maintained as a collimated light beam in the main scanning direction x, even if the light beam L passes through the cylindrical lens 30.

Meanwhile, even if form deviations are reduced by correcting the shape of a core and performing injection-molding again, slight variations may occur in curvatures of the incident surface 30a and the emission surface 30b of the cylindrical lens 30 per shot during fabrication due to variations in injection-molding conditions of an injection-molding apparatus. Hereinafter, a tolerable limit of slight variations in curvatures of the incident surface 30a and the emission surface 30b of the cylindrical lens 30, that is, a tolerable limit of form deviations will be described.

Generally, when a beam diameter is $w_0$ at the center of the beam waist, a beam diameter $w(z)$ at a location z away from the center of the beam waist, may be expressed as Mathematical Expression 4 below.

$$w^2(z) = w_0^2\left(1 + \left(\frac{\lambda z}{\pi w_0^2}\right)^2\right)$$  [Mathematical Expression 4]

Here, $\lambda$ indicates the wavelength of a light beam, and $w_0$ indicates the beam diameter of a light beam in the main scanning direction x when the light scanning unit is designed. Here, when the tolerable variation $\alpha$ of the beam diameter $w(z)$ is defined as shown in Mathematical Expression 5 below, the distance z within the tolerable variation a may be expressed as shown in Mathematical Expression 6.

$$w(z) = w_0(1 + \alpha)$$  [Mathematical Expression 5]

$$z < \frac{\pi w_0^2}{\lambda}\sqrt{\alpha^2 + 2\alpha}$$  [Mathematical Expression 6]

Mathematical Expression 7 below may be obtained by applying variation in imaging distances to z in Mathematical Expression 6.

$$|l - l_0| < \frac{\pi w_0^2}{\lambda}\sqrt{\alpha^2 + 2\alpha} \qquad \text{[Mathematical Expression 7]}$$

Here, l indicates a distance from a light scanning unit to an imaging location at which a component of a light beam in the main scanning direction x is imaged, that is, an imaging distance of an entire optical system of a light scanning unit with respect to the main scanning direction x, and $l_0$ indicates an imaging distance of an entire optical system of a light scanning unit with respect to the main scanning direction x in the case of employing a cylindrical lens of which both the incident surface and the emission surface are flat in the main scanning direction. When the tolerable variation of a beam diameter preventing deterioration of beam diameter is 0.0005, variation in imaging distances approximately satisfies Mathematical Expression 8.

$$|l - l_0| < 0.1 \frac{w_0^2}{\lambda} \qquad \text{[Mathematical Expression 8]}$$

Even after the shape of a core is corrected, curvatures of the incident surface 30a and the emission surface 30b of the cylindrical lens 30 are changed in every shot during fabrication due to deviations in injection-molding. However, variation in beam diameters due to variation in injection-molding conditions may be minimized by maintaining conditions for injection-molding the cylindrical lens 30 to satisfy Mathematical Expression 8 above. In other words, Mathematical Expression 8 may be defined as tolerable variation in imaging distances in the main scanning direction x of a light scanning unit.

Next, conditions for designing a cylindrical lens will be described with reference to embodiments described below.

Embodiment 1

A cylindrical lens having a refractive index of 1.53 and a center thickness of 3 mm may be designed to have various curvatures in the main scanning direction x as shown in Table 1 below.

TABLE 1

| R1 | R2 |
|---|---|
| −30 | −31.0399 |
| 30 | 28.96014 |
| −50 | −51.0399 |
| 50 | 48.96014 |
| −70 | −71.0399 |
| 70 | 68.96014 |
| −100 | −101.04 |
| 100 | 98.96014 |

Here, R1 indicates the radius of curvature of the incident surface of a cylindrical lens in the main scanning direction x, whereas R2 indicates the radius of curvature of the emission surface of a cylindrical lens in the main scanning direction x. The radii of curvature in Table 1 are expressed in mm.

Embodiment 2

Figure 4:
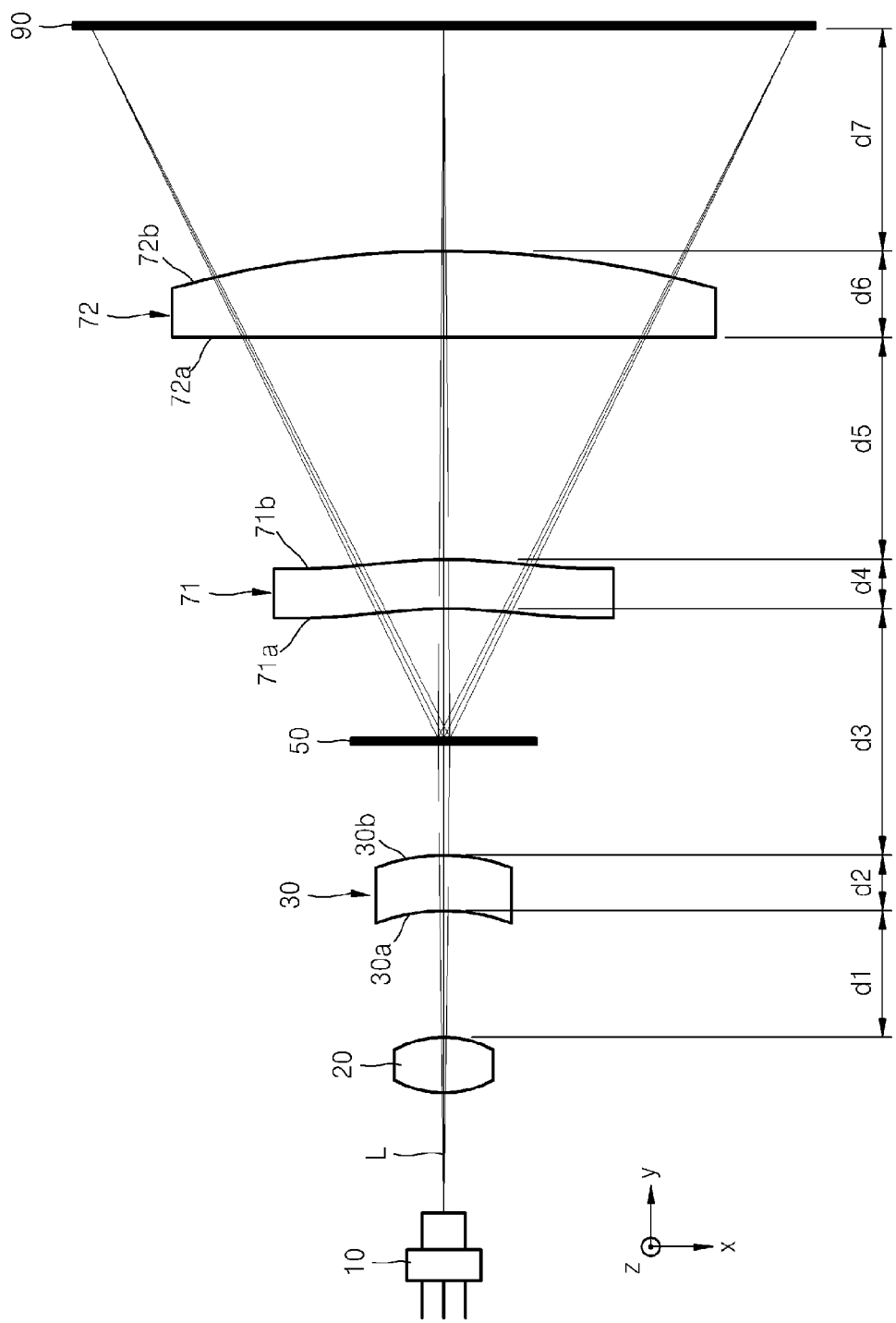
FIG. 4 is a diagram showing the arrangement of optical devices of the light scanning unit of FIG. 1, viewed along the light path.

FIG. 4 is a diagram showing the arrangement of optical devices of the light scanning unit of FIG. 1, viewed along the light path. For convenience of explanation, the light deviating from the light path at the light deflector 50 will be referred to as a scanning light path. According to the embodiment of FIG. 4, the optical devices of the light scanning unit are designed to satisfy Table 2 below except for the radius of curvature of the emission surface 30b of the cylindrical lens 30 in the main scanning direction x.

TABLE 2

| N | 1.530503 |
|---|---|
| d1 | 35 |
| d2 | 3 |
| d3 | 150 |
| d4 | 12.5 |
| d5 | 120 |
| d6 | 7.5 |
| d7 | 104.13 |
| fC | 4000 |
| R1 | 50 |
| R3(fθ 1) | −300 |
| R4(fθ 1) | −90 |
| R5(fθ 2) | −2000 |
| R6(fθ 2) | −5000 |
| Used Wavelength λ | 655 nm |
| Designed Beam Diameter w0 | 60 um |

Here, n indicates refractive index of the optical devices, and d1, d2, d3, . . . , and d7 indicate intervals between the optical devices and thicknesses of the optical devices, as shown in FIG. 4. In Table 2, $f_C$ indicates a distance from the collimating lens 20 to an imaging location (that is, the surface of the photosensitive drum 90) when there are only the light source 10 and the collimating lens 20. Furthermore, R3 and R4 respectively indicate radii of curvatures of the incident surface 71a and emission surface 71b of a first imaging optical device 71, and R5 and R6 respectively indicate radii of curvatures of the incident surface 72a and the emission surface 72b of a second imaging optical device 72. The distances (except for those used for wavelength λ and designed beam diameter $w_0$) are expressed in mm.

According to Mathematical Expression 8, a condition that tolerable imaging distance variations $|l-l_0|$ should be less than approximately 0.55 mm is obtained, and, according to the optical design of the light scanning unit shown in FIG. 1, the imaging distance variations $|l-l_0|$ based on variation in radius of curvature R2 of the emission surface 30b of a cylindrical lens 30 in the main scanning direction x are as shown in Table 3 below.

TABLE 3

| R2 | $|f - f_0|$ |
|---|---|
| 48.8 | 1.891509 |
| 48.81 | 1.765763 |
| 48.82 | 1.640115 |
| 48.83 | 1.514565 |
| 48.84 | 1.389113 |
| 48.85 | 1.263759 |
| 48.86 | 1.138503 |
| 48.87 | 1.013344 |
| 48.88 | 0.888283 |
| 48.89 | 0.76332 |
| 48.9 | 0.638454 |
| 48.91 | 0.513685 |
| 48.92 | 0.389013 |
| 48.93 | 0.264439 |
| 48.94 | 0.139961 |
| 48.95 | 0.01558 |
| 48.96 | −0.1087 |
| 48.97 | −0.23289 |

TABLE 3-continued

| R2 | $|f - f_0|$ |
|---|---|
| 48.98 | −0.35698 |
| 48.99 | −0.48098 |
| 49 | −0.60488 |
| 49.01 | −0.72868 |
| 49.02 | −0.85239 |
| 49.03 | −0.976 |
| 49.04 | −1.09951 |
| 49.05 | −1.22293 |
| 49.06 | −1.34626 |
| 49.07 | −1.46948 |
| 49.08 | −1.59262 |
| 49.09 | −1.71565 |

In Table 3, the radii of curvatures R1 and R2 are expressed in mm. Table 3 shows that, in a cylindrical lens, when the radius of curvature R1 of the incident surface in the main scanning direction is 50 mm, the radius of curvature R2 of the emission surface in the main scanning direction preventing deterioration of beam diameter is in the range of about 48.91 to about 48.99.

Figure 5:
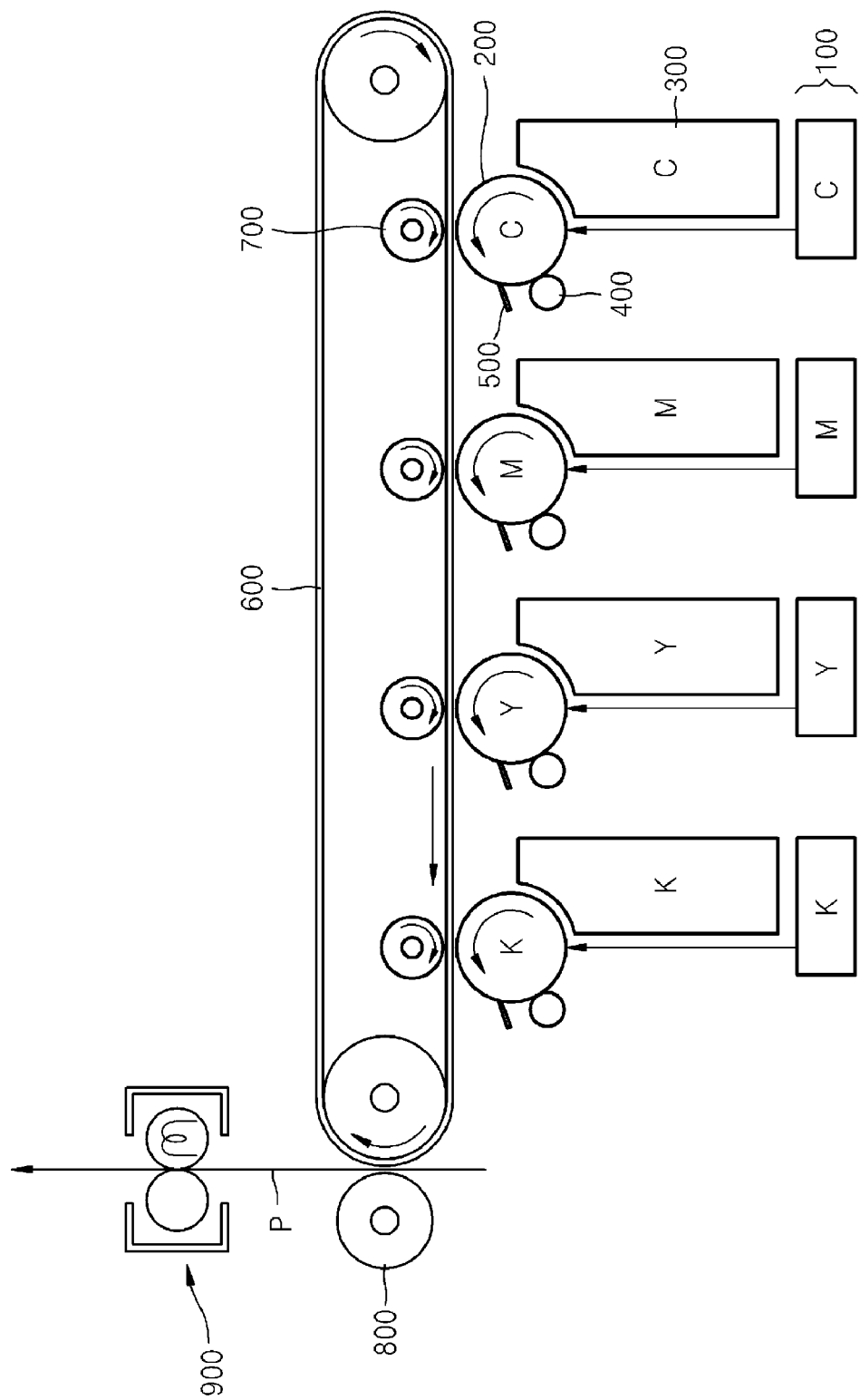
FIG. 5 is a schematic view of an electrophotographic image forming apparatus employing the light scanning unit of FIG. 1, according to an embodiment.

FIG. 5 is a schematic view of an electrophotographic image forming apparatus employing a plurality of light scanning units 100.

Referring to FIG. 5, the image forming apparatus may include four light scanning units 100, four photoconductive drums 200, four developers 300, four charging rollers 400, four cleaning units 500, an intermediate transfer belt 600, four first transfer rollers 700, a second transfer roller 800, and a fixing unit 900.

To print a color image, the light scanning units 100, the photoconductive drums 200, and the developers 300 may be prepared with respective colors. Each of the light scanning units 100 may be a light scanning unit according to the previous embodiment. Each of the photoconductive drums 200 is an example of a photoconductor and includes a photoconductive layer having a predetermined thickness, wherein the photoconductive layer is formed on the outer surface of a cylindrical metal pipe. Although not shown, a photoconductive belt may be alternatively employed as a photoconductor. The outer surface of each of the photoconductive drums 200 constitutes a surface being scanned. The charging rollers 400 are examples of charging devices which contact the photoconductive drums 200 and roll on the surface of the photoconductive drums 200 to charge the surface of the photoconductive drums 200 with a uniform electric potential. A charging bias is applied to the charging rollers 400. Corona charging units (not shown) may be used instead of the charging rollers 400. The light scanning units 100 scan a light beam which is modified based on image information in the main scanning direction and form an electrostatic latent image on the surfaces being scanned of the photoconductive drums 200. At this point, the surface being scanned moves in the sub scanning direction as the photoconductive drums 200 rotate, and the light scanning units 100 scan a light beam onto the surfaces being scanned in the main scanning direction in synchronization with a horizontal synchronization signal, and thus a two-dimensional electrostatic latent image is formed on the surfaces being scanned of the photoconductive drums 200.

Electrostatic latent images, each of which corresponds to image information of each of black K, magenta M, yellow Y, and cyan C, are respectively formed on the four photoconductive drums 200. The four developers 300 respectively supply toners of black K, magenta M, yellow Y, and cyan C to the photoconductive drums 200 to form toner images in black K, magenta M, yellow Y, and cyan C. The intermediate transfer belt 600 contacts the four photoconductive drums 200 and rolls across the drums 200. The black K, magenta M, yellow Y, and cyan C toner images are transferred to the intermediate transfer belt 600 by a first transfer bias applied to the first transfer roller 700 and overlapped with each other on the intermediate transfer belt 600. Remaining toner images on the four photoconductive drums 200 after the transfer are removed by the cleaning unit 500. The toner images transferred to the intermediate transfer belt 600 are transferred to a printing medium P by applying a second transfer bias to the second transfer roller 800. The toner images transferred to the printing medium P receive heat and pressure from the fixing unit 900 and are fixed to the printing medium P. Accordingly, a printing task is completed.

As described above, a cylindrical lens used in a light scanning unit according to an embodiment reduces deterioration of beam diameter by reducing form deviation of the main scanning surface. As a result, electrostatic latent images formed on a photoconductive drum have uniform quality, and thus images formed on a printing medium have uniform quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light scanning unit comprising:
a light source which emits a light beam;
a light deflector which deflects and scans the light beam emitted by the light source in a main scanning direction; and
a cylindrical lens which is disposed between the light source and the light deflector and images the light beam emitted by the light source on a reflective surface of the light deflector in a sub scanning direction,
wherein at least one of an incident surface and an emission surface of the cylindrical lens is curved in the main scanning direction, and
wherein the cylindrical lens satisfies a mathematical expression $10<|R_n|<1000 (n=1,2)$ and $R_1 \cdot R_2 > 0$, where $R_1$ indicates a radius of curvature of the incident surface of the cylindrical lens in the main scanning direction, and $R_2$ indicates a radius of curvature of the emission surface of the cylindrical lens in the main scanning direction.

2. The light scanning unit of claim 1, wherein the cylindrical lens further satisfies:

$$R_2 = R_1 - \left(\frac{n-1}{n}\right)d,$$

where n indicates a refractive index of the cylindrical lens, and d indicates a center thickness of the cylindrical lens.

3. The light scanning unit of claim 1, further comprising a collimating lens which is disposed between the light source and the light deflector and collimates the light beam emitted by the light source to obtain collimated light.

4. The light scanning unit of claim 3, wherein the light scanning unit scans a surface of a photoconductive drum, the light scanning unit further comprising an imaging optical unit which images a light beam deflected and scanned by the light deflector on the surface being scanned of the photoconductive drum.

5. The light scanning unit of claim 1, wherein the incident surface has a radius of curvature, and the emission surface has a radius of curvature having a same sign as the radius of curvature of the incident surface.

6. A light scanning unit comprising:
a light source which emits a light beam;
a light deflector which deflects and scans the light beam emitted by the light source in a main scanning direction;
a cylindrical lens which is disposed between the light source and the light deflector and images the light beam emitted by the light source on a reflective surface of the light deflector in a sub scanning direction, wherein at least one of an incident surface and an emission surface of the cylindrical lens being curved in the main scanning direction;
a collimating lens which is disposed between the light source and the light deflector and collimates the light beam emitted by the light source to obtain collimated light,
wherein the light scanning unit scans a surface of a photoconductive drum, the light scanning unit further comprising an imaging optical unit which images a light beam deflected and scanned by the light deflector on the surface being scanned of the photoconductive drum,
wherein the cylindrical lens further satisfies:

$$|l - l_0| < \frac{\pi w_0^2}{\lambda} \sqrt{\alpha^2 + 2\alpha},$$

where l indicates an imaging distance of the light scanning unit with respect to the main scanning direction, $l_0$ indicates an imaging distance of the light scanning unit with respect to the main scanning direction when both the incident surface and the emission surface of the cylindrical lens are flat in the main scanning direction, $w_0$ indicates a beam diameter of the light beam in the main scanning direction when the light scanning unit is designed, $\lambda$ indicates a wavelength of the light beam, and $\alpha$ indicates a tolerable variation of the beam diameter.

7. The light scanning unit of claim 6, wherein the cylindrical lens further satisfies:

$$|l - l_0| < 0.1 \frac{w_0^2}{\lambda}.$$

8. An electrophotographic image forming apparatus comprising:
a photoconductor;
a light scanning unit which forms an electrostatic latent image on a surface of the photoconductor that is scanned by a light beam; and
a developer which develops the electrostatic latent image formed on the photoconductor by supplying a toner thereto,
wherein the light scanning unit comprises:
a light source which emits the light beam;
a light deflector which deflects and scans the light beam emitted by the light source in a main scanning direction; and
a cylindrical lens which is disposed between the light source and the light deflector and images the light beam emitted by the light source on a reflective surface of the light deflector in a sub scanning direction, and
at least one of an incident surface and an emission surface of the cylindrical lens is curved in the main scanning direction,
wherein the cylindrical lens satisfies $10<|R_n|<1000$ (n=1,2) and $R_1 \cdot R_2 > 0$, where $R_1$ indicates a curvature of the incident surface of the cylindrical lens in the main scanning direction, and $R_2$ indicates a curvature of the emission surface of the cylindrical lens in the main scanning direction.

9. The electrophotographic image forming apparatus of claim 8, wherein the cylindrical lens further satisfies:

$$R_2 = R_1 - \left(\frac{n-1}{n}\right)d,$$

where n indicates a refractive index of the cylindrical lens, and d indicates a center thickness of the cylindrical lens.

10. The electrophotographic image forming apparatus of claim 8, further comprising a collimating lens which is disposed between the light source and the light deflector and collimates the light beam emitted by the light source to obtain collimated light.

11. The electrophotographic image forming apparatus of claim 10, further comprising an imaging optical unit which images a light beam deflected and scanned by the light deflector on the surface being scanned of the photoconductor.

12. An electrophotographic image forming apparatus comprising:
a photoconductor;
a light scanning unit which forms an electrostatic latent image on a surface of the photoconductor that is scanned by a light beam; and
a developer which develops the electrostatic latent image formed on the photoconductor by supplying a toner thereto,
wherein the light scanning unit comprises:
a light source which emits the light beam;
a light deflector which deflects and scans the light beam emitted by the light source in a main scanning direction;
a cylindrical lens which is disposed between the light source and the light deflector and images the light beam emitted by the light source on a reflective surface of the light deflector in a sub scanning direction, at least one of an incident surface and an emission surface of the cylindrical lens being curved in the main scanning direction;
a collimating lens which is disposed between the light source and the light deflector and collimates the light beam emitted by the light source to obtain collimated light; and
an imaging optical unit which images a light beam deflected and scanned by the light deflector on the surface being scanned of the photoconductor,
wherein the cylindrical lens further satisfies:

$$|l - l_0| < \frac{\pi w_0^2}{\lambda} \sqrt{\alpha^2 + 2\alpha},$$

where l indicates an imaging distance of the light scanning unit with respect to the main scanning direction, $l_0$ indicates an imaging distance of the light scanning unit with respect to the main scanning direction when both the incident surface and the emission surface of the cylindrical lens are flat in the main scanning direction, $w_0$ indicates the beam diameter of the light beam in the main scanning direction when the light scanning unit is designed, $\lambda$ indicates the wavelength of the light beam, and a indicates a tolerable variation of the beam diameter.

13. The electrophotographic image forming apparatus of claim 12, wherein the cylindrical lens further satisfies:

$$|l - l_0| < 0.1 \frac{w_0^2}{\lambda}.$$

UNITED STATES PATENT AND TRADEMARK OFFICE
CERTIFICATE OF CORRECTION

PATENT NO.           : 8,339,434 B2
APPLICATION NO.      : 12/875291
DATED                : December 25, 2012
INVENTOR(S)          : Won-young Cho It is certified that error appears in the above-identified patent and that said Letters Patent is hereby corrected as shown below:

In the Claims:

Column 11; Line 42; In Claim 6, delete "and a" and insert -- and α --, therefor.

Column 13, Line 4; In Claim 12, delete "and a" and insert -- and α --, therefor.

Signed and Sealed this
Twenty-first Day of May, 2013

Teresa Stanek Rea
*Acting Director of the United States Patent and Trademark Office*